United States Patent [19]

Araki et al.

[11] Patent Number: 5,646,201
[45] Date of Patent: Jul. 8, 1997

US005646201A

[54] AQUEOUS DISPERSION OF FLUORINE-CONTAINING COPOLYMER

[75] Inventors: Takayuki Araki; Nobuhiko Tsuda; Yasushi Yonei, all of Settsu, Japan

[73] Assignee: Daikin Industries, Ltd., Osaka, Japan

[21] Appl. No.: 612,866

[22] PCT Filed: Sep. 16, 1994

[86] PCT No.: PCT/JP94/01530

§ 371 Date: Mar. 13, 1996

§ 102(e) Date: Mar. 13, 1996

[87] PCT Pub. No.: WO95/08582

PCT Pub. Date: Mar. 30, 1995

[30] Foreign Application Priority Data

Sep. 22, 1993 [JP] Japan ................................. 5-236493

[51] Int. Cl.$^6$ .......................... C08L 15/02; C08L 27/16
[52] U.S. Cl. ........................ 523/201; 523/206; 524/545; 525/902
[58] Field of Search ........................... 523/201, 206; 525/902; 524/545

[56] References Cited

U.S. PATENT DOCUMENTS

| | | | |
|---|---|---|---|
| 4,391,940 | 7/1983 | Kuhls et al. | 523/201 |
| 4,780,490 | 10/1988 | Mizuno et al. | 523/201 |
| 5,030,667 | 7/1991 | Shimizu et al. | 523/201 |

FOREIGN PATENT DOCUMENTS

| | | |
|---|---|---|
| 2-274711 | 11/1990 | Japan . |
| 3-7784 | 1/1991 | Japan . |
| 4-189879 | 7/1992 | Japan . |
| 4-248821 | 9/1992 | Japan . |
| 4-325509 | 11/1992 | Japan . |

*Primary Examiner*—Tae Yoon
*Attorney, Agent, or Firm*—Varndell Legal Group

[57] ABSTRACT

Aqueous dispersion of a fluorine-containing copolymer which is prepared by, in an aqueous dispersion containing fluorine-containing copolymer particles which comprise 70 to 95% by mole of vinylidene fluoride and 5 to 30% by mole of chlorotrifluoroethylene, seed-polymerizing 20 to 100 parts by weight of an acrylic acid ester and/or a methacrylic acid ester in the presence of 100 parts by weight of the fluorine-containing copolymer particles. The aqueous dispersion assures excellent film forming property, and can provide a highly glossy coating excellent in mechanical properties, transparency at clear coating and weatherability.

6 Claims, No Drawings

AQUEOUS DISPERSION OF FLUORINE-CONTAINING COPOLYMER

TECHNICAL FIELD

The present invention relates to an aqueous dispersion of a fluorine-containing copolymer, which is excellent in film forming property and transparency at clear coating, weatherability and mechanical properties of coating and can provide a coating being highly glossy. Specifically the present invention relates to an aqueous dispersion of a fluorine-containing copolymer obtainable by seed polymerization of a specific amount of an acrylic acid ester and/or methacrylic acid ester in the presence of seed particles prepared by copolymerizing vinylidene fluoride (VdF) with a specific amount of chlorotrifluoroethylene (CTFE).

BACKGROUND ART

Fluorine-containing paints are used as weather resistive paints for exterior and interior coatings of medium- or low-storied buildings, and various techniques have been developed for preparation of the fluorine-containing paints. Though many of the fluorine-containing paints are in the form of organic solvent dispersion, there are problems in the use of organic solvents from safety and environmental protection points of view, and an aqueous dispersion type is preferable. As the methods of preparing an aqueous dispersion of a fluorine-containing polymer, there are known the methods mentioned below.

JP-B-55441/1992 and JP-A-7784/1991 disclose that film forming property and transparency, which cannot be obtained by an emulsion blend, are obtainable by emulsion-polymerization of an ethylenically unsaturated monomer in the presence of particles of a VdF copolymer in an aqueous medium. As one of monomers copolymerizable with VdF in such a VdF copolymer, there is disclosed CTFE, and as examples of the ethylenically unsaturated monomer, there are disclosed ethyl acrylate (EA), methyl methacrylate (MMA) and the like. However the above-mentioned patent publications disclose neither combination of VdF and CTFE nor copolymerizing ratio thereof, and also there is no disclosure as to seed polymerization of EA and MMA in the presence of VdF/CTFE copolymer particles. Also in those patent publications, there is no disclosure as to gloss of the coating, which is a very important property in practical use as paints.

Further though the above-mentioned patent publications state that the coating being excellent in transparency and mechanical strength can be obtained, according to the inventors' actual studies it has been found that the transparency of the obtained coating do not reach the level enough for practical use for clear coating, and thus further investigation is required.

According to the studies made by the present inventors, compatibility of various known VdF copolymers with an acrylic resin is not sufficient even if the compatibility between the resins is intended to be increased by the seed polymerization, and neither a transparent film can be obtained at film formation nor a highly glossy coating can be obtained.

Also JP-A-190745/1989 discloses that an organic solvent solution of a fluorine-containing polymer polymerized in non-aqueous system is converted to aqueous system, and therein a vinyl monomer is then polymerized, and that examples of the polymerizing components of the fluorine-containing copolymer are VdF, CTFE and the like and examples of the vinyl monomer are EA, MMA and the like. However there is no concrete disclosure as to a combination use of VdF and CTFE and a copolymerizing ratio thereof and also as to seed polymerization of EA and MMA in the presence of VdF/CTFE copolymer particles. In addition, the obtained film has problems of being inferior in transparency and insufficient mechanical properties.

Further JP-A-189879/1992 discloses a solution blend of a vinylidene fluoride (VdF)/tetrafluoroethylene (TFE)/chlorotrifluoroethylene (CTFE) terpolymer and an acrylic resin. The VdF/TFE/CTFE terpolymer is compatibilized with the acrylic resin in the presence of an organic solvent, but there is no description as to the compatibilization in the presence of water.

Also JP-B-14392/1982 discloses that a stable mixed emulsion can be obtained by adding a surfactant when emulsion-blending a VdF polymer and an acrylic polymer. However according to the techniques disclosed in that patent publication, no advantage due to compatibilization can be obtained, that is, compatibilized polymer at molecular level like a solvent type cannot be obtained, a transparent film cannot be obtained at film formation and mechanical properties are not sufficient.

The present invention was made to solve the above-mentioned problems, and an object of the present invention is to provide an aqueous dispersion of a fluorine-containing copolymer which is excellent in film forming property, and can give a coating having a high gloss and being excellent in transparency at clear coating, weather resistance and mechanical properties.

The present inventors have found that an aqueous dispersion compatibilized at a molecular level is obtainable by seed polymerization of a specific amount of an acrylic acid ester and/or methacrylic acid ester in an aqueous dispersion containing fluorine-containing copolymer particles (hereinafter may be referred to as "seed particles") having a specified composition comprising 70 to 95% (% by mole, hereinafter the same) of VdF and 5 to 30% of CTFE among the VdF type copolymers in the presence of the fluorine-containing copolymer particles and that the dispersion can achieve the above-mentioned object, and then the present invention has been completed.

DISCLOSURE OF THE INVENTION

Namely, the present invention relates to an aqueous dispersion of a fluorine-containing copolymer obtainable by, in an aqueous dispersion containing fluorine-containing copolymer particles which comprise 70 to 95% of VdF and 5 to 30% of CTFE, seed-polymerizing 20 to 100 parts (part by weight, hereinafter the same) of an acrylic acid ester and/or a methacrylic acid ester in the presence of 100 parts of the fluorine-containing copolymer particles.

BEST MODE FOR CARRYING OUT THE INVENTION

The fluorine-containing copolymer used in the present invention as the seed particles comprises 70 to 95% of VdF and 5 to 30% of CTFE, preferably 75 to 90% of VdF and 10 to 25% of CTFE, more preferably 75 to 85% of VdF and 15 to 25% of CTFE.

When VdF is less than 70%, compatibility of the seed particles with the acrylic and/or methacrylic copolymer is lowered, and no excellent property resulting from the compatibility, such as excellent transparency and mechanical properties of the film (hereinafter referred to as "cast film") formed by drying the emulsion, cannot be obtained.

Also when CTFE is less than 5%, since solubility of the seed particles to an acrylic acid ester and/or methacrylic acid ester is inferior, swelling of the monomer into the seed particles at the time of seed polymerization is not proceeded rapidly, a cast film obtained from the resulting emulsion has poor transparency, and a desired gloss of the coating formed from a paint cannot be obtained.

The fluorine-containing copolymer may contain a third copolymerizable monomer other than VdF and CTFE as a copolymerizing component. As the third copolymerizable monomer, there are TFE, vinyl fluoride (VF), hexafluoropropylene (HFP), trifluoroethylene (TrFE) and the like, and TFE is used preferably. As the third monomer, plural monomers may be used. The content of the third monomers is from 0 to 30%, preferably from 10 to 25% more preferably from 10 to 20%.

In case where the seed particles contain no CTFE and comprise VdF and TFE or VF, solubility of the seed particles to the monomer is poor, swelling of the monomer into the seed particles at the time of seed polymerization does not progress quickly, a cast film obtained from the resulting emulsion is inferior in transparency, and a desired gloss of the coating formed from a paint is not obtainable.

In case where the seed particles contain no CTFE and comprise VdF and HFP or TrFE, they have solubility to the monomer depending on the copolymerization ratio, but since HFP and TrFE lower their compatibility with the acrylic and/or methacrylic copolymer, there are problems such that the cast film obtained from the resulting emulsion still has poor transparency and a highly glossy coating cannot be obtained.

The size of the seed particles closely relates to the particle size of the polymer after the seed polymerization. In order to make the particle size of the polymer after the seed polymerization not more than 250 nm, it is preferable that the particle size of the seed particles is not more than 200 nm, preferably not more than 180 nm, more preferably not more than 150 nm.

The fluorine-containing copolymer used as the seed particles is obtainable by usual emulsion polymerization. An aqueous dispersion containing the seed particles having a particle size of not more than 200 nm can be prepared by emulsion polymerization of a monomer mixture containing VdF and CTFE under coexistence of not more than 1.0% by weight, preferably not more than 0.5% by weight, more preferably not more than 0.2% by weight (lower limit is usually 0.01% by weight) of a fluorine-containing surfactant on the basis of water and 0.001 to 0.1% by weight, preferably 0.01 to 0.05% by weight of a nonionic non-fluorine-containing surfactant on the basis of water. The resulting aqueous dispersion can contain the seed particles having a particle size of not more than 200 nm in a high concentration of 30 to 50% by weight. When the mount of the fluorine-containing surfactant used exceeds 1.0% by weight, precipitation of the surfactant occurs in the film when the film is formed from the aqueous dispersion. Also since there is a tendency that a water absorption increases and water becomes whitened, it is not preferable if the fluorine-containing surfactant is more than 1.0% by weight. When the mount of the nonionic fluorine-containing surfactant is more than 0.1% by weight, it is not practical because the polymerization rate is decreased due to chain transfer reaction and then the polymerization stops. Also when less than 0.001% by weight, there is almost no effect by making the particle size fine. The polymerization temperature is from 20° to 120° C., preferably from 30° to 70° C. When lower than 20° C., stability of the produced latex generally tends to be lowered, and when higher than 120° C., the polymerization rate tends to be lowered due to the chain transfer reaction. Polymerization is carried out usually by heating for 5 to 100 hours under a pressure in the range of 1.0 to 50 kgf/cm$^2$ (gauge pressure).

As the fluorine-containing surfactant used in the emulsion polymerization of the seed particles, there is one or a mixture of compounds containing fluorine atoms in their structures and having surface activity. For example, there are an acid represented by $X(CF_2)_n COOH$ (n is an integer of 6 to 20, X stands for F or H), its alkali metal salt, ammonium salt, amine salts or quaternary ammonium salt; an acid represented by $Y(CH_2CF_2)_m COOH$ (m is an integer of 6 to 13, Y stands for F or Cl ), its alkali metal salt, ammonium salt, amine salt or quaternary ammonium salt; or the like. More specifically, there are an ammonium salt of perfluoro (octanoic acid), an ammonium salt of perfluoro(nonanoic acid) or the like. In addition, there can be used the known fluorine-containing surfactants.

As the nonionic non-fluorine-containing surfactant used in emulsion polymerization of the seed particles, there are polyoxyethylene alkyl ethers, polyoxyethylene alkyl phenyl ethers, polyoxyethylene alkyl esters, sorbitan alkyl esters, polyoxyethylene sorbitan alkyl esters, glycerol esters, their derivatives and the like. More specifically, examples of polyoxyethylene alkyl ethers are polyoxyethylene lauryl ether, polyoxyethylene cetyl ether, polyoxyethylene stearyl ether, polyoxyethylene oleyl ether, polyoxyethylene behenyl ether and the like; examples of polyoxyethylene alkyl phenyl ethers are polyoxyethylene nonyl phenyl ether, polyoxyethylene octyl phenyl ether and the like; examples of polyoxyethylene alkyl esters are polyethylene glycol monolaurylate, polyethylene glycol monooleate, polyethylene glycol monostearate and the like; examples of sorbitan alkyl esters are polyoxyethylene sorbitan monolaurylate, polyoxyethylene sorbitan monopalmitate, polyoxyethylene sorbitan monostearate, polyoxyethylene sorbitan monooleate and the like; examples of polyoxyethylene sorbitan alkyl esters are polyoxyethylene sorbitan monolaurylate, polyoxyethylene sorbitan monopalmitate, polyoxyethylene sorbitan monostearate and the like; and examples of glycerol esters are glycerol monomyristate, glycerol monostearate, glycerol monooleate and the like. Also examples of their derivatives are polyoxyethylene alkyl amine, a polyoxyethylene alkyl phenyl-formaldehyde condensate, polyoxyethylene alkyl ether phosphate and the like. Particularly preferable are polyoxyethylene alkyl ethers and polyoxyethylene alkyl esters having an HLB value of 10 to 18. More particularly there are polyoxyethylene lauryl ether (EO: 5 to 20. EO stands for an ethylene oxide unit), polyethylene glycol monostearate (EO: 10 to 55) and polyethylene glycol monooleate (EO: 6 to 10).

In the present invention, the monomer comprising an acrylic acid ester and/or methacrylic acid ester is seed-polymerized in the presence of the seed particles. This monomer encompasses one consisting of an acrylic acid ester and/or methacrylic acid ester and one comprising acrylic acid ester and/or methacrylic acid ester and a monomer copolymerizable therewith.

From a point of compatibility with the fluorine-copolymer, preferable are ethyl acrylate as the acrylic acid ester, and methyl methacrylate and ethyl methacrylate as the methacrylic acid ester, and there is used one of them or the combination of two or more of them.

The acrylic acid ester and/or methacrylic acid ester and the other monomers which are copolymerizable therewith can be seed-polymerized. As the copolymerizable monomer, an ethylenically unsaturated monomer is preferable.

As the ethylenically unsaturated monomer, there are monomers having a functional group(s) and vinyl compounds. Examples of the monomers having a functional group(s) are, for instance, unsaturated carboxylic acids such as acrylic acid (AAc), methacrylic acid, maleic acid and crotonic acid; amide compounds such as acrylamide, methacrylamide, N-methylacrylamide, N-methylolacrylamide, N-butoxymethylacrylamide, N-methylolmethacrylamide, N-methylmethacrylamide and N-butoxymethylmethacrylamide; hydroxyl group-containing monomers such as hydroxyethyl acrylate, hydroxyethyl methacrylate (HEMA), hydroxypropyl acrylate and hydroxypropyl methacrylate; epoxy group-containing monomers such as glycidyl acrylate and glycidyl methacrylate; silanol group-containing monomers such as methacryloyloxy-γ-trimethoxysilane and methacryloyloxy-γ-triethoxysilane; aldehyde group-containing monomers such as acrolein; and the like. As the vinyl compounds, there are, for example, styrene (St), acrylonitrile and the like.

In case that the above-mentioned ethylenically unsaturated monomer used together, it is preferable that the amount of the acrylic acid ester and/or methacrylic acid ester is not less than 60% by weight on the basis of the whole monomer mixture, preferably from 70 to 100% by weight, more preferably from 80 to 100% by weight. When less than 60% by weight, compatibility with the seed particles becomes worse and transparency of the formed film and gloss of a coating in the present invention tend to be lowered.

The total mount of the above-mentioned ethylenically unsaturated monomer and acrylic acid ester and/or methacrylic acid ester is from 20 to 100 parts per 100 parts of the seed particles, preferably from 30 to 100 parts, more preferably from 40 to 100 parts. When less than 20 parts, there is a tendency that transparency and gloss of the coating are lowered.

The seed polymerization of the acrylic acid ester and/or methacrylic acid ester and the ethylenically unsaturated monomer can be carried out under the same conditions as in usual emulsion polymerization, for example, the reaction is carried out at 20° to at 90° C., preferably 20° to 80° C., more preferably 30° to 70° C. for 0.5 to 6 hours by adding a surfactant, a polymerization initiator, a chain transfer agent, and if necessary, a chelating agent, a pH controlling agent, a solvent and the like to a water medium containing the seed particles.

In the seed polymerization, there may be used any one of the methods such as a method of charging the whole mount of monomers at the same time into a reactin system in the presence of the seed particles, a method of charging a part of the monomers for the reaction and then the remaining part thereof continuously or dividedly, and a method of charging the whole mount of the monomers continuously.

When seed-polymerizing, by an emulsion polymerization method, the acrylic acid ester, methacrylic acid ester and ethylenically unsaturated monomer in the presence of the seed particles, at first there occurs swelling of the seed particles with the monomers, and at this point the aqueous dispersion becomes in the state where the seed particles are dissolved homogeneously in the monomers. Then the monomers are polymerized by adding a polymerization initiator to form single phase polymer blend particles in which the molecular chains are entangled with each other. Also there can be formed an interpenetrating polymer network (IPN) by copolymerizing polyfunctional monomers. As the polyfunctional monomers, there are monoglycol dimethacrylate, diglycol dimethacrylate and the like.

As the surfactant, there can be used an anionic surfactant, a nonionic surfactant, a combination thereof or an amphoteric surfactant. As the anionic surfactant, there are used esters of higher alcohol sulfate, for example, sodium alkylsulfonate, sodium alkylbenzenesulfonate, sodium succinate dialkylestersulfonate, sodium alkyldiphenylether disulfonate and the like. As the nonionic surfactant, there are used polyoxyethylene alkyl ether, polyoxyethylene alkyl phenyl ether, polyoxyethylene alkyl ester, polyoxyethylene alkyl phenyl ester, sorbitan alkyl ester, glycerol ester, their derivatives and the like. As the amphoteric surfactant, there are used lauryl betaine and the like. Also there can be used so-called reactive emulsifying agents copolymerizable with the acrylic acid ester, methacrylic acid ester and ethylenically unsaturated monomer, such as sodium styrene sulfonate and sodium alkylsulfosuccinate. The amount of the surfactant is usually from about 0.05 to about 5.0 parts per 100 parts of the sum of the acrylic acid ester, methacrylic acid ester and ethylenically unsaturated monomer.

The polymerization initiator is not particularly limited and may be one which produces radicals usable for a free radical reaction at 20° to 90° C. in an aqueous medium. The initiator can be used in combination use of a reducing agent, if necessary. In general, examples of the water-soluble polymerization initiator are a persulfate and hydrogen peroxide, and examples of the reducing agent are sodium pyrosulfite, sodium hydrogensulfite, sodium L-ascorbate, and the like. Examples of the oil soluble polymerization initiator are diisopropylperoxydicarbonate (IPP), benzoyl peroxide, dibutyl peroxide, azobisisobutyronitrile (AIBN) and the like. The amount of the polymerization initiator is usually from about 0.05 to about 2.0 parts per 400 parts of the sum of the acrylic acid ester, methacrylic acid ester and ethylenically unsaturated monomer.

The polymerization temperature is from 20° to 90° C., preferably from 30° to 70° C.

Examples of the chain transfer agent are a halogenated hydrocarbon (for example, chloroform, carbon tetrachloride or the like), mercaptan (for example, n-dodecylmercaptan, t-dodecylmercaptan or n-octylmercaptan) and the like. The amount of the chain transfer agent is usually from 0 to around 5.0 parts per 100 parts of the sum of the acrylic acid ester, methacrylic acid ester and ethylenically unsaturated monomer.

As the solvent, there can be used methyl ethyl ketone, acetone, trichlorotrifluoroethane, methyl isobutyl ketone, ethyl acetate or the like in such a small mount as not impairing workability, safety against disaster, environmental safety and safety in production. There is a case where swelling ability of the monomer to the seed particles is improved by adding the solvent.

The aqueous dispersion of a fluorine-containing copolymer of the present invention is obtainable as mentioned above, and it is more preferable, from a point of enhancement of a film forming property according to the object of the present invention, to carry out the seed polymerization of the methacrylic acid ester and a monomer copolymerizable therewith in the presence of an aqueous dispersion containing fluorine-containing copolymer particles having Tg in the range of −35° C. to 25° C., thereby the minimum film forming temperature of the aqueous dispersion of a fluorine-containing copolymer can be set optionally in the range of 0° to 70° C. by selecting the above-mentioned Tg of the seed particles.

Setting of the Tg of the fluorine-containing copolymer in the aqueous dispersion can be controlled by a known method, namely by a copolymerization ratio of vinylidene fluoride to other fluorine-containing monomer. For the miscible polymer system, in general, the Tg of polymer blends meets the Fox's equation, and in order to set the Tg of the resin in the aqueous dispersion of fluorine-containing copolymer at around 0° C. to around 70° C., it is preferable that the Tg of the fluorine-containing copolymer is from −35° to 25° C. It is also preferable that the methacrylic acid ester having 1 to 6 carbon atoms at its side chain is contained in an mount of not less than 80% by weight on the basis of monomers to be added at the time of the seed polymerization.

The methacrylic acid ester having 1 to 6 carbon atoms at its side chain is preferable because its influence on the lowering of weatherability is small, and since its compatibility with the VdF copolymer resin is increased as the number of carbon atoms at the side chain decreases, the methacrylic acid ester having 1 to 3 carbon atoms at its side chain is more preferable, and methyl methacrylate which has one carbon atom at its side chain is further preferable.

Examples of the above-mentioned monomer copolymerizable with the methacrylic acid ester are (I) monomers having a reactive functional group(s), for instance, unsaturated carboxylic acids such as acrylic acid, methacrylic acid, maleic acid and crotonic acid; amide compounds such as acrylamide, methacrylamide, N-methylacrylamide, N-methylolacrylamide, N-butoxymethylacrylamide, N-methylolmethacrylamide, N-methylmethacrylamide and N-butoxymethylmethacrylamide; hydroxyl group-containing monomers such as hydroxyethyl acrylate, hydroxyethyl methacrylate, hydroxypropyl acrylate and hydroxypropyl methacrylate; epoxy group-containing monomers such as glycidyl acrylate and glycidyl methacrylate; silanol group-containing monomers such as methacryloyloxy-γ-trimethoxysilane and methacryloyloxy-γ-triethoxysilane; aldehyde group-containing monomers such as acrolein; and the like, and in addition, (II) vinyl compounds such as styrene and acrylonitrile.

Also there can be copolymerized polyfunctional monomers such as ethylene glycol dimethacrylate and propylene glycol dimethacrylate for the purpose to enhance solvent resistance and water resistance.

At the time of emulsion polymerization in the presence of the particles in the aqueous dispersion, as a copolymerizable monomer having ethylenically unsaturated bond, there can be used a compound containing a low molecular weight polymer or oligomer having hydrophilic portion in its molecule. The above-mentioned hydrophilic portion is one having hydrophilic group, hydrophilic bond or combination thereof. This hydrophilic group may be of anionic type, nonionic type, amphoteric type or combination thereof, and the nonionic type hydrophilic group and the anionic type hydrophilic group are preferable. Also there can be used a known reactive emulsifying agent.

Commercially available examples of the above-mentioned monomers and the reactive emulsifying agents are Blemmer PE-350, Blemmer PME-400 and Blemmer 70PEP350B (available from NOF Corporation), NK Ester M-40G, NK Ester M-90G, NK Ester M-230G, NK Ester AMP-60G, NK Ester CB-1, NK Ester SA and NK Ester A-SA (available from Shin-Nakamura Kagaku Kabushiki Kaisha) and Eleminol JS2 and Eleminol RS30 (available from Sanyo Kasei Kogyo Kabushiki Kaisha) and the like.

Among the above-mentioned monomers, derivatives of methacrylic acid ester which do not have an adverse effect on weatherability are preferable.

In the present invention it is preferable that the average size of the polymer particles in the aqueous dispersion which are obtainable by the seed polymerization is from 50 to 250 nm, more preferably from 100 to 200 nm, particularly preferably from 100 to 160 nm. When the average particle size is less than 50 nm, viscosity of the aqueous dispersion increases and the aqueous dispersion having a high concentration cannot be obtained. Also when more than 250 nm, sedimentation and further coagulation of the polymer particles occur when storing the aqueous dispersion. Also there is a problem that no gloss is exhibited in the formed film.

The aqueous dispersion of a fluorine-containing copolymer of the present invention can be used as paints by blending additives usually used for aqueous emulsion paints, such as pigments, thickeners, dispersing agents, defoaming agents, antifreezing agents and auxiliaries for film formation, as a surface protective coating for concrete and as a coating material for paper coating.

The present invention is then explained based on examples, but is not limited thereto.

PREPARATION EXAMPLE 1

A one-liter pressure resistive reactor equipped with a stirrer was charged with 500 ml of deionized water, 0.5 g of an ammonium salt of perfluoro(octanoic acid) and 0.05 g of a nonionic non-fluorine-containing surfactant, i.e. polyoxyethylene monostearic acid ester (MYS25 available from Nikko Chemicals Co., Ltd.), and steps of introduction of pressurized nitrogen gas and deaeration were repeated to remove the dissolved air. A fluorine-containing monomer mixture comprising VdF and CTFE in a molar ratio of 93/7 was fed continuously. Then after the reaction for 30 hours, the reaction system was rendered to normal temperature and normal pressure, and thereby the reaction was terminated. The obtained seed particles comprising VdF and CTFE and the aqueous dispersion containing the seed particles were subjected to the following measurements. The results are shown in TABLE 1.

Solid Content:

An aqueous dispersion was dried at 150° C. for one hour in a vacuum dryer. A weight after drying is shown by a percentage to a weight of the aqueous dispersion before drying.

Average Particle Size:

Measured by a laser beam scattering particle size analyzer (ELS-3000 available from Otsuka Denshi Kabushiki Kaisha).

Limit Viscosity:

A limit viscosity [η] at 35° C. in an MEK solution was measured.

PREPARATION EXAMPLES 2 TO 15

Aqueous dispersions of PREPARATION EXAMPLES 2 to 15 containing the seed particles were prepared in the same manner as in PREPARATION EXAMPLE 1 except that the composition (% by mole) of the fluorine-containing monomers was changed as shown in TABLE 1. Solid content and others were measured in the same manner as in PREPARATION EXAMPLE 1, and the results are shown in TABLE 1.

TABLE 1

| | PREPARATION EXAMPLES | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| VdF | 93 | 80 | 88 | 80 | 74 | 70 | 97 | 90 | 67 | 60 | 68 | 74 | 83 | 82 | 83 |
| CTFE | 7 | 20 | 6 | 5 | 14 | 10 | 3 | | 33 | 15 | | | | | |
| TFE | | | 6 | 15 | 12 | 20 | | 10 | | 15 | 32 | 18 | | | |
| HFP | | | | | | | | | | | | 8 | 17 | | |
| VF | | | | | | | | | | | | | | 18 | |
| TrFE | | | | | | | | | | | | | | | 17 |
| Average particle size (nm) | 126.3 | 141.2 | 134.1 | 143.5 | 138.0 | 136.0 | 131.0 | 123.2 | 133.5 | 141.3 | 151.6 | 135.0 | 143.6 | 121.4 | 156.0 |
| Limit viscosity [η] | 1.85 | 1.68 | 1.75 | 1.78 | 1.48 | 1.37 | 1.81 | Not dissolved | 1.56 | 1.73 | Not dissolved | 1.55 | 1.58 | Not dissolved | 1.65 |
| Solid content (% by weight) | 27.1 | 34.3 | 28.2 | 33.6 | 35.0 | 32.8 | 24.3 | 21.0 | 34.5 | 32.6 | 23.7 | 35.1 | 34.2 | 20.8 | 22.3 |

EXAMPLE 1

Experimental Example 1

A 200 ml four-necked flask equipped with a stirring blade, cooling tube and thermometer was charged with 70 g of the aqueous dispersion prepared in PREPARATION EXAMPLE 1, and thereto was added sodium dodecylbenzenesulfonate and Triton X100 (available from Union Carbide Co., Ltd) as a nonionic surfactant in an amount of 0.5% by weight respectively on the basis of the solid. When the bath temperature reached 80° C. by heating in a water bath with stirring, an emulsion prepared by emulsifying a monomer mixture of methyl methacrylate (hereinafter referred to as "MMA")/ethyl acrylate (hereinafter referred to as "EA") having a weight ratio of 50:50 and an amount equivalent to the solid content by using a 0.5% by weight aqueous solution of MYS25 (available from Nikko Chemicals Co., Ltd.) was added dropwise for one hour. Immediately after completion of the addition, 1 ml of a 2% by weight aqueous solution of ammonium persulfate was added to initiate the reaction. At three hours after the initiation of the reaction, the inside temperature of the bath was raised to 85° C. and after keeping at that temperature for one hour, then cooled. Then DH was adjusted to 7 by using an aqueous ammonia solution, followed by filtration with a 300 mesh metal net to give a bluish white colored aqueous dispersion of the fluorine-containing copolymer.

The following measurements were made for the obtained aqueous dispersion, and the results are shown in TABLE 2.

(1) Evaluation of Characteristics of Aqueous Dispersion Solid Content and Average Particle Size:

Same Methods as in PREPARATION EXAMPLE 1 Minimum Film Forming Temperature (MFT):

A minimum temperature at which a continuous film was formed was measured with a thermal gradient tester (available from Rigaku Kogyo Kabushiki Kaisha). Film formation at a lower temperature can be conducted when MFT is as low as possible.

(2) Evaluation of Characteristics of Formed Film Transparency:

The aqueous dispersion was poured into a 10 cm diameter petri dish so that a thickness of the dried coating becomes 200 μm, and dried at 50° C. for 24 hours. In Experimental Example 25, the drying was conducted at 80° C. for 24 hours. A beam transmittance of the film was measured at 800 nm wave length, and the transparency was evaluated as follows.

○: Transparent (transmittance; over 90%)

Δ: Semitransparent (transmittance; from 60 to 90%)

X: Whitened (transmittance; less than 60%)

Mechanical Properties:

Strength and elongation at Break were measured in accordance with JIS K6301.

(3) Evaluation of Characteristics of Coating

To the aqueous dispersion prepared in Experimental Example were added 50 parts of titanium oxide (tradename CR90 available from Ishihara Sangyo Kabushiki Kaisha) as the filler, 2 parts of DISCOAT H-14 (available from Nippon Nyukazai Kabushiki Kaisha) as the dispersing agent, 1 part of ethylene glycol as the antifreezing agent, 0.5 part of FS ANTIFOAM 013B (available from Nippon Nyukazai Kabushiki Kaisha) as the defoaming agent, 0.5 part of SN THICKENER A-818 (available from Sannopco Kabushiki Kaisha) as the thickener and 10 parts of TEXANOL CS12 (available from Chisso Kabushiki Kaisha) as the auxiliary for film forming per 100 parts of the solids of the aqueous dispersion, followed by mixing sufficiently by using a dispersing stirrer to prepare a paint.

Gloss:

The obtained paint was coated on a glass sheet by an applicator so that the coating thickness becomes 20 μm. After drying at room temperature for one week, gloss of the coating was measured (measuring angle: 60°) by using a gloss meter (available from Suga Shikenki Kabushiki Kaisha).

Weatherability:

The obtained paint was coated on a slate sheet which had been primer-treated with DAN WHITE SEALER (available from Nippon Paint Co., Ltd.) by using an airless spray gun so that the coating thickness becomes 100 μm after dried. The coated slate sheet was dried at room temperature for 24 hours and then at 80° C. for 2 hours. After this coated sheet was allowed to stand for 1,000 hours in an accelerated weathering machine (SUV), gloss retention was measured and evaluated as follows.

○: Gloss retention; over 80%

Δ: Gloss retention; from 60 to 80%

X: Gloss retention; less than 60%

Alkali Resistance:

The coated sheet prepared in the same manner as in the weatherability test was dipped in a 3% by weight aqueous solution of NaOH at 50° C. for one week, and then coloring and blistering of the coating were checked with the naked eyes and judged.

Acid Resistance:

The coated sheet prepared in the same manner as in the weatherability test was dipped in a 1% by weight aqueous sulfuric acid solution at 50° C. for one week, and then coloring and blistering of the coating were checked with the naked eyes and judged.

Experimental Examples 2 to 15

The seed polymerization and the tests were carried out in the same manner as in Experimental Example 1 by using the aqueous dispersions prepared in PREPARATION EXAMPLES 2 to 15. The results are shown in TABLE 2.

TABLE 2

| | Experimental Examples | | | | | | | |
|---|---|---|---|---|---|---|---|---|
| | 1 | 2 | 3 | 4 | 5 | 6 | 7 | 8 |
| Weight ratio of seed particles/ monomer | 50/50 | 50/50 | 50/50 | 50/50 | 50/50 | 50/50 | 50/50 | 50/50 |
| MMA | 50 | 50 | 50 | 50 | 50 | 50 | 50 | 50 |
| EA | 50 | 50 | 50 | 50 | 50 | 50 | 50 | 50 |
| Solid content (% by weight) | 37.4 | 47.3 | 37.6 | 46.1 | 47.6 | 45.0 | 33.3 | 28.5 |
| Average particle size (nm) | 186.4 | 198.1 | 197.6 | 210.0 | 204.1 | 197.6 | 193.3 | 183.9 |
| Minimum film forming temperature (°C.) | 32 | 8 | 21 | 15 | 8 | 13 | 39 | 47 |
| Crack | None | None | None | None | None | None | Slight crack found | Crack found |
| Transparency | ○ | ○ | ○ | ○ | ○ | ○ | Δ | X |
| Strength at break (kgf/cm$^2$) | 280 | 58 | 234 | 275 | 160 | 203 | — | — |
| Elongation at break (%) | 290 | 460 | 285 | 212 | 360 | 312 | — | — |
| Weatherability | ○ | ○ | ○ | ○ | ○ | ○ | — | — |
| Alkali resistance | ○ | ○ | ○ | ○ | ○ | ○ | — | — |
| Acid resistance | ○ | ○ | ○ | ○ | ○ | ○ | — | — |
| Gloss (60° G) | 58.5 | 59.7 | 64.2 | 73.6 | 76.0 | 74.2 | — | — |

| | Experimental Examples | | | | | | |
|---|---|---|---|---|---|---|---|
| | 9 | 10 | 11 | 12 | 13 | 14 | 15 |
| Weight ratio of seed particles/ monomer | 50/50 | 50/50 | 50/50 | 50/50 | 50/50 | 50/50 | 50/50 |
| MMA | 50 | 50 | 50 | 50 | 50 | 50 | 50 |
| EA | 50 | 50 | 50 | 50 | 50 | 50 | 50 |
| Solid content (% by weight) | 47.6 | 44.7 | 32.7 | 48.2 | 46.7 | 28.7 | 30.1 |
| Average particle size (nm) | 194.5 | 208.3 | 214.1 | 199.5 | 212.0 | 187.3 | 230.1 |
| Minimum film forming temperature (°C.) | 9 | 13 | 26 | 12 | 11 | 19 | 42 |
| Crack | None | None | Slight crack found | None | None | Crack found | Crack found |
| Transparency | Δ | Δ | X | Δ | Δ | X | X |
| Strength at break (kgf/cm$^2$) | 53 | 73 | — | 82 | 69 | — | — |
| Elongation at break (%) | 430 | 347 | — | 210 | 251 | — | — |
| Weatherability | ○ | ○ | — | ○ | ○ | — | — |
| Alkali resistance | ○ | ○ | — | ○ | ○ | — | — |
| Acid resistance | ○ | ○ | — | ○ | ○ | — | — |
| Gloss (60° G) | 41.3 | 39.5 | — | 46.2 | 43.1 | — | — |

From TABLE 2, it is found that in case where the VdF unit is less than 70%, the transparency of the formed film is lowered and there is no gloss appearing on the coating. Also it is found that in case where CTFE of the comonomer is less than 5% or the comonomer is one other than CTFE, there no film forming ability or transparency of the film is lowered and no gloss appears on the coating even if the VdF unit is not less than 70[{]jf44aEXAMPLE 2

Experimental Examples 16 to 25

The seed polymerization and evaluation were carried out in the same manner as in Experimental Example 1 by using the aqueous dispersion (Tg of the seed particles was 16° C.) prepared in PREPARATION EXAMPLE 5 and MMA, EA, butyl acrylate (BA), acrylic acid (AAc), hydroxyethyl methacrylate (HEMA), styrene (St) and cyclohexyl methacrylate (CHMA) in the amounts (parts) shown in TABLE 3. The results are shown in TABLE 3.

TABLE 3

| | Experimental Examples | | | | | | | | | |
|---|---|---|---|---|---|---|---|---|---|---|
| | 16 | 17 | 18 | 19 | 20 | 21 | 22 | 23 | 24 | 25 |
| Weight ratio of seed particles/monomer | 70/30 | 50/50 | 50/50 | 50/50 | 50/50 | 50/50 | 50/50 | 50/50 | 50/50 | 50/50 |
| MMA | 100 | | 50 | 50 | 40 | 60 | | | | 100 |
| EA | | 100 | 45 | 45 | 30 | | 50 | | 50 | |
| BA | | | | | | 40 | | 100 | | |
| AAc | | | 5 | | | | | | | |
| HEMA | | | | 5 | | | | | | |
| St | | | | | 30 | | 50 | | | |
| CHMA | | | | | | | | | 50 | |
| Solid content (% by weight) | 39.4 | 45.2 | 45.5 | 46.3 | 43.6 | 45.0 | 44.9 | 46.1 | 47.1 | 46.3 |
| Average particle size (nm) | 157.8 | 182.0 | 175.2 | 178.3 | 175.4 | 173.5 | 175.1 | 181.6 | 183.3 | 178.1 |
| Minimum film forming temperature (°C.) | 42 | 7 | 15 | 15 | 28 | 17 | 39 | 18 | — | 69 |
| Crack | None | None | None | None | None | None | None | None | Slight crack found | None |
| Transparency | O | O | O | O | O | O | Δ | Δ | X | O |
| Strength at break (kgf/cm$^2$) | 2.62 | 0.51 | 1.50 | 1.83 | 2.81 | 2.00 | 1.31 | 0.20 | 0.37 | 3.58 |
| Elongation at break (%) | 244 | 473 | 367 | 330 | 281 | 245 | 321 | 420 | 285 | 108 |
| Weatherability | O | O | O | O | O | O | O | O | — | O |
| Gloss | 69.0 | 72.5 | 75.4 | 73.2 | 61.3 | 74.8 | 56.3 | 62.0 | — | 71.3 |

INDUSTRIAL APPLICABILITY

The aqueous dispersion of a fluorine-containing copolymer of the present invention is excellent in film forming property, and can provide a highly glossy coating excellent in transparency at clear coating, weatherability and mechanical properties.

We claim:

1. An aqueous dispersion of a fluorine-containing copolymer which is obtainable by, in an aqueous dispersion containing fluorine-containing copolymer particles which comprise 70 to 95% by mole of vinylidene fluoride and 5 to 30% by mole of chlorotrifluoroethylene, seed-polymerizing 20 to 100 parts by weight of an acrylic acid ester and/or a methacrylic acid ester in the presence of 100 parts by weight of the fluorine-containing copolymer particles.

2. An aqueous dispersion of a fluorine-containing copolymer which is obtainable by, in an aqueous dispersion containing fluorine-containing copolymer particles which comprise 70 to 95% by mole of vinylidene fluoride and 5 to 30% by mole of chlorotrifluoroethylene, seed-polymerizing 20 to 100 parts by weight of a monomer mixture comprising an acrylic acid ester and/or a methacrylic acid ester and a monomer copolymerizable therewith in the presence of 100 parts by weight of the fluorine-containing copolymer particles.

3. The aqueous dispersion of the fluorine-containing copolymer of claim 2, wherein said monomer mixture contains 60 to 100% by weight of the acrylic acid ester and/or the methacrylic acid ester.

4. The aqueous dispersion of the fluorine-containing copolymer of claim 1, wherein the acrylic acid ester and/or the methacrylic acid ester is at least one selected from the group consisting of ethyl acrylate, methyl methacrylate and ethyl methacrylate.

5. The aqueous dispersion of the fluorine-containing copolymer of claim 2, wherein the arcylic acid ester and/or the methacrylic acid ester is at least one selected from the group consisting of ethyl acrylate, methyl methacrylate and ethyl methacrylate.

6. The aqueous dispersion of the fluorine-containing copolymer of claim 3, wherein the acrylic acid ester and/or the methacrylic acid ester is at least one selected from the group consisting of ethyl acrylate, methyl methacrylate and ethyl methacrylate.

* * * * *